(12) United States Patent
Hertrich et al.

(10) Patent No.: US 7,312,811 B2
(45) Date of Patent: Dec. 25, 2007

(54) VIDEO COMMUNICATION SYSTEM

(75) Inventors: James P. Hertrich, Arlington Heights, IL (US); Edward Polanek, Richmond, IL (US); Robert E. Kralik, Hoffman Estates, IL (US)

(73) Assignee: NITEK International, LLC, Rolling Meadows, IL (US)

( * ) Notice: Subject to any disclaimer, the term of this patent is extended or adjusted under 35 U.S.C. 154(b) by 86 days.

(21) Appl. No.: 11/280,928

(22) Filed: Nov. 16, 2005

(65) Prior Publication Data

US 2006/0103726 A1      May 18, 2006

Related U.S. Application Data

(60) Provisional application No. 60/629,041, filed on Nov. 18, 2004.

(51) Int. Cl.
*H04N 7/18*      (2006.01)
*H04N 7/173*      (2006.01)

(52) U.S. Cl. ....................... 348/143; 725/130

(58) Field of Classification Search ................ 348/143, 348/14.11, 372; 725/130; 379/56.2; 709/208
See application file for complete search history.

(56) References Cited

U.S. PATENT DOCUMENTS

| | | | | |
|---|---|---|---|---|
| 5,218,627 A | * | 6/1993 | Corey et al. | 348/14.11 |
| 5,345,592 A | * | 9/1994 | Woodmas | 725/130 |
| 5,481,478 A | * | 1/1996 | Palmieri et al. | 709/208 |
| 5,664,002 A | * | 9/1997 | Skinner, Sr. | 379/56.2 |
| 2003/0217364 A1 | | 11/2003 | Polanek et al. | |

* cited by examiner

*Primary Examiner*—Gims Philippe
(74) *Attorney, Agent, or Firm*—George H. Gerstman; Seyfarth Shaw LLP

(57) ABSTRACT

A system and method in which two voltages are provided to a camera site. The voltages are used to power cameras having separate voltage requirements.

12 Claims, 4 Drawing Sheets

VIDEO COMMUNICATION SYSTEM

RELATED APPLICATION

This application claims the benefit of the filing date of copending U.S. Provisional Application No. 60/629,041, filed Nov. 18, 2004, the disclosure of which is incorporated herein.

FIELD OF INVENTION

This invention relates to a communication system for the transmission of closed circuit television signals over a plurality of twisted pair wires. The application relates in particular to interconnection apparatus and methods for handling all of the electrical requirements for video systems, such as Closed Circuit TV ("CCTV") systems, including those of the types used in video security systems.

BACKGROUND

In the past, buildings would have several cabling systems, respectively for different types of communications systems. For example, telephone wiring was used for voice, coaxial cable for data and video networks, multi-pair cabling for RS232/RS422 control data, etc. With all of the separate costs involved, this became a very inefficient and costly way to install these systems. A solution was to install a standard cable and connector system throughout a building, which could, with some additional equipment, be used to support all, or most of the different types of communication systems in use in the building. This standard cable and connector system is called a "Structured Cabling System" ("SCS").

The SCS is a set of cabling and connectivity products that integrate voice, data, video and various building management systems ("BMS"), such as safety alarms, security access, energy systems, etc. Characteristics of an SCS include an open architecture, standardized media and layout, standard connection interfaces, adherence to national and international standards, and total system design and installation. Typically, SCS cable is a multi-pair cable made up of unshielded twisted pairs ("UTP") of insulated copper conductors. A typical SCS cable includes four such twisted pairs. A typical building has a plurality of SCS cables, perhaps dozens or even hundreds, extending throughout the building. Apart from the SCS, the voice, data, video and BMS have nothing in common, except for similar transmission characteristics (analog or digital data signals) and delivery methods (conduit, cable, tray, raceway, etc.) that support and protect the cabling.

The SCS is constructed and installed under a common set of rules. By constructing all SCS systems under these rules, everyone knows how the SCS will perform. These rules are changed from time to time by groups representing the industries involved. The rules are available in order to provide a standard that everyone can work from.

Presently, there are products that allow standard CCTV equipment to interface with a SCS. This equipment generally uses 24 VAC, which is appropriate for large scale systems. There is also a need, however, for the use of 12VDC cameras in certain systems.

Large scale systems almost exclusively use 24VAC because almost all camera systems use a centralized power supply and 24VAC cameras are not as sensitive to the voltage drop problem as DC cameras are. Also, a mix of both DC and 24VAC cameras, would mean putting two separate power supplies in and routing cables separately.

Using the SCS as a method for camera installation is a relatively new method as was explained earlier. All prior systems within the SCS operated on a single voltage and that was commonly 24VAC. In an attempt to provide for both 12 VDC and 24VAC cameras in a single power supply system a rectifier and regulator were used at the camera end. This system is shown in FIG. 1. This was an unsatisfactory attempt to solve the problem because switching noise and power supply ripple flow into the video signal ground causing interference in the video picture.

FIG. 1 shows a prior art 24VAC camera 10 with an isolated power supply at the camera. Note that it does not provide a path for current flow back to the 24VAC source 12 though the video ground because they are isolated. FIG. 1 also shows that with two 12VDC cameras 14 connected to the system a current path is provided. DC cameras use the same ground for both the power and the video, therefore providing a path back to the transformer through the second camera's video ground connection. The common video ground in the Intermediate Distribution Frame (IDF) closet closes a loop. Current drawn though the filter capacitors and the camera load is coupled into the camera ground connection. Noise from the 24VAC current changes through the cycle and the noise of the diodes switching are felt in the video pair and that noise is imparted on to the video signal and displayed in the video picture.

Attempts to fix the problem have focused on tying the camera ground to earth ground. With a good earth ground at the camera and at the IDF closet a third path for current is created. If the third path to ground is of low enough impedance it will usually fix the problem. But this may not always work and even when it does it requires an additional connection outside of the SCS. Of course, additional connections outside of the SCS are not the standard.

The invention presented here provides a method for the transmission of power and control data to the camera as well as video from the camera, over the SCS. It also allows for the use of 24 VAC and 12 VDC cameras in the same system. The ability to mix and match both 12 VDC and 24 VAC cameras in a single installation provide a completive advantage in both price and performance.

SUMMARY OF THE INVENTION

In accordance with the present invention, a video distribution system is provided. In one embodiment, the video distribution system comprises at least one camera site with a power supply coupled to the camera site. The power supply is operable to provide a first voltage to at least one camera site. A converter is coupled to the power supply and at least one camera site. The converter is operable to convert the first voltage to a second voltage and to provide to the at least one camera site. The converter is located at a distribution site that is spaced apart from the camera site.

In the preferred embodiment, the first voltage is 24 VAC and the second voltage is 12 VDC, and the converter comprises a voltage regulator and a voltage rectifier.

In one embodiment of the present invention, the video distribution system comprises a main distribution frame closet and at least one intermediate distribution frame closet connected to the main distribution frame closet. At least one camera site is connected to the at least one intermediate distribution frame closet. The intermediate frame closet includes a power supply that is operable to provide a first voltage to the at least one camera site and a converter operable to convert the first voltage to the second voltage and to provide the second voltage to the intermediate distribution frame closet.

In accordance with the principles of the present invention, a method is provided for configuring a video distribution system. The method comprises establishing at least one camera site; providing a power supply operable to provide a first voltage; providing a converter operable to convert the first voltage to a second voltage; connecting the power supply to the at least one camera site; connecting the converter to the power supply and the at least one camera site; and locating the converter apart from the at least one camera site.

A more detailed explanation of the invention is provided in the following description and claims, and is illustrated in the accompanying drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
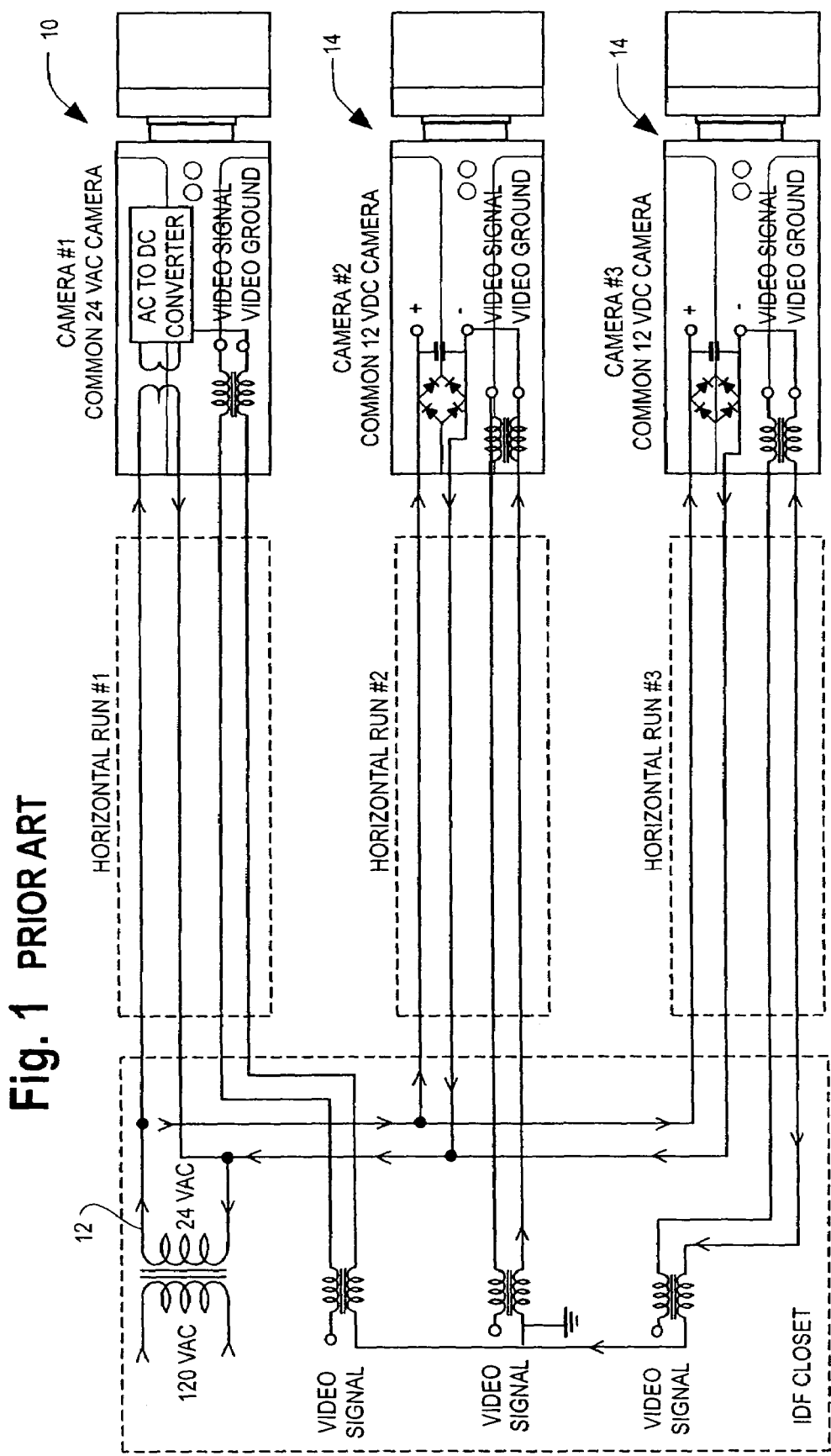
FIG. 1 is a wiring diagram depicting a prior art structured cabling system incorporating a 24 VAC camera and 12 VDC cameras with voltage regulation and rectification circuitry located at the camera site.
Figure 1A:
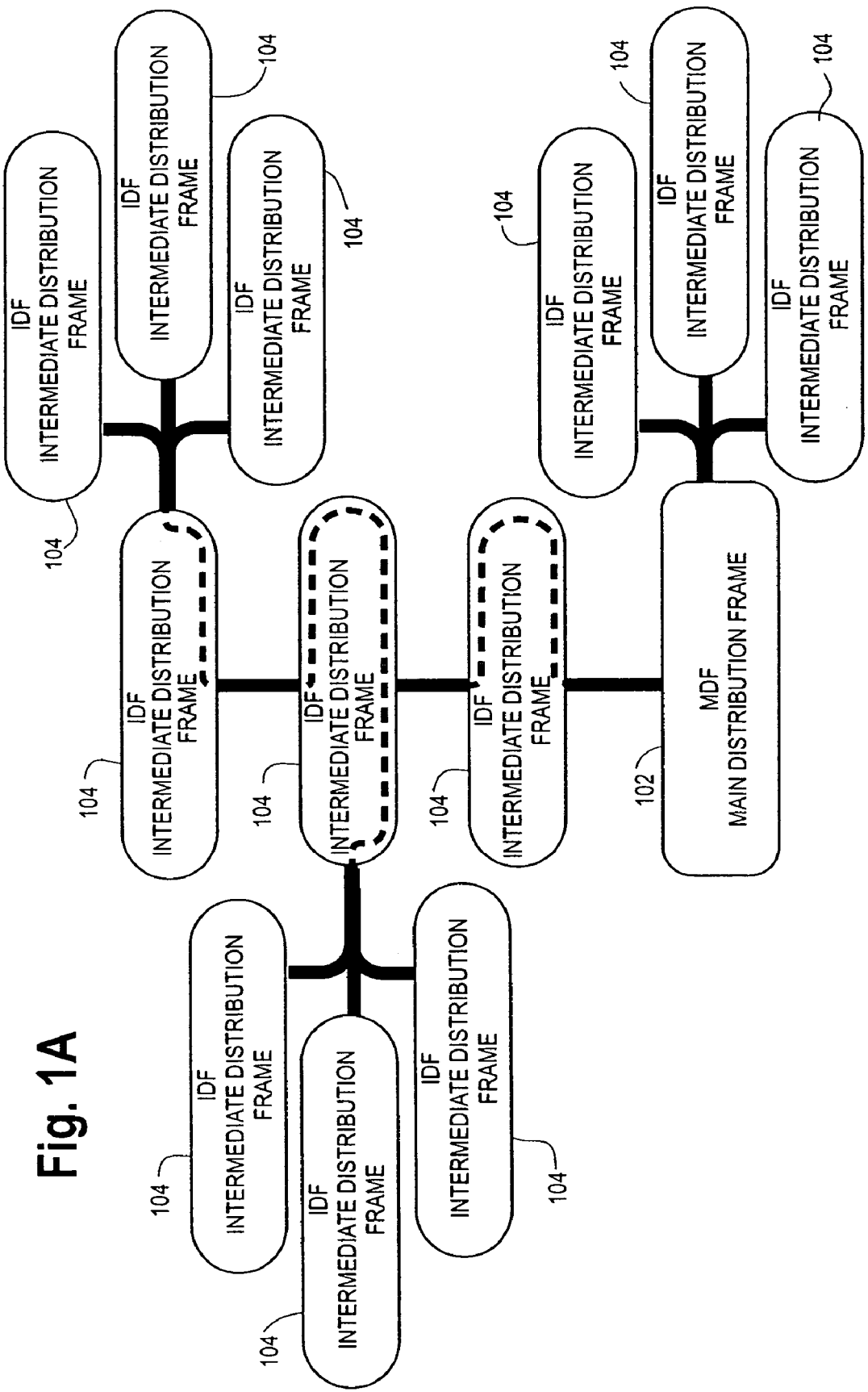
FIG. 1A is an organizational diagram of a typical structured cabling system.

FIG. 1A shows an exemplary depiction of the SCS. There is a MDF (Main Distribution Frame) 102. From the MDF 102, the SCS wiring fans out though out a facility. The MDF 102 typical is the point where the outside world for telecommunication connects into the facility. IDFs (Intermediate Distribution Frame) 104 are interconnect points in a facility that connect to MDF 102. While wiring from one IDF 104 may pass though another IDF 104 point on return to the MDF 102, typically IDF 104 to IDF 104 connections are made with cross connections in the MDF 102. IDF 104 points, also referred to as IDF closets, serve a specific area of a facility. For example a school may have an IDF 104 for each wing and an office building may have an IDF 104 for each two or three floors. From the IDF 104, wiring is routed out to the floor space of the facility. The runs forming the IDF 104 around the floor space are called horizontal run. The horizontal runs are typically limited to 100 meters. Thus, in SCS facilities any location can be connected to any other location with a minimum of labor and new materials. Therefore, a CCTV transmission system which can interface with the SCS is an easier, quicker and a more cost effective solution.

Figure 2:
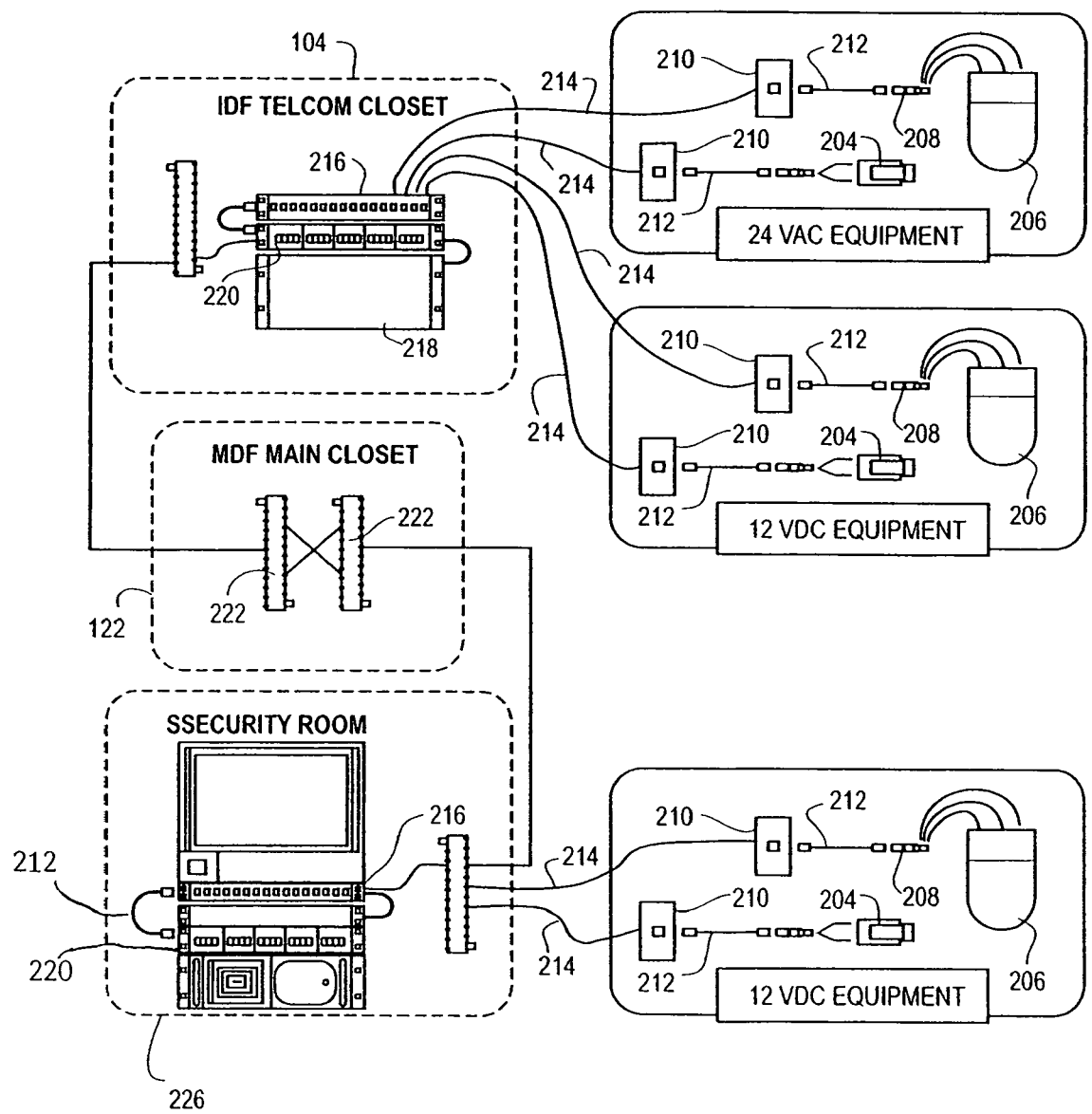
FIG. 2 is a functional block diagram of a structured cabling system incorporating 24 VAC and 12 VDC cameras in accordance with one aspect of the invention.

FIG. 2 shows a more detailed look at how CCTV fits into the SCS environment. A description can also be found in published U.S. Patent Application No. 2003/0217364, which is hereby incorporated by reference.

Referring to FIG. 2, the video picture is generated by one or more cameras. Two of the most common types are shown here, fixed cameras 204 and PTZ cameras 206. Fixed cameras 204 are just that, they are fixed on a particular scene or view, with no way to change what they view other then someone physically moving the camera. They need only be supplied with power and they produce a video output. PTZ cameras 206 are movable. A PTZ camera 206 needs both power and a control signal and it produces a video output. The control signal is generated at the monitoring location by a joystick type device [not shown]. A person uses the joystick to tell the PTZ camera 206 where to point and how to zoom in or out, etc. There are some cameras labeled as 24VAC and some labeled as 12VDC. While 24VAC cameras are the most common for large installation they are also more costly due to more expensive electronic used in the camera. Often a mix of 12VDC and 24VAC cameras is the best solution for a customer.

The use of DC powered cameras, most commonly 12VDC, is growing as companies try to cut cost. One problem with the use of DC cameras in an installation is the voltage drop. Due to the fact that the cameras are lower cost they are very sensitive their operating voltage. Too little and they do not give a picture and too much can greatly shorten their operating life.

A camera interfaces to the SCS though a "splitter" unit 208. The function of the splitter unit 208 is to "break out" the video, power and data as separate connections to the camera and to provide a single standard connection to the SCS. Additionally, the splitter unit 208 converts the video to a signal that can be sent over the network wiring. Currently the standard connection is an RJ45 jack. The splitter 208 is connected to a wall jack 210 via a patch cord 212. A patch cord 212 is an eight wire, four pair cable with an RJ45 plug on each end. Patch cords 212 are used commonly within the SCS for making interconnections. The wall jack 210 is an RJ45 jack that terminates the horizontal run 214. Horizontal run 214 is the common term used for the SCS wiring between the IDF 104 and a wall jack 210.

Horizontal runs can vary in length. An exemplary value for the length of a horizontal rune would be at least 5 meters. It should be noted, however, that this disclosure is not meant to limit the length of a horizontal run to a particular range. Nevertheless, for practical reasons a horizontal run will be long enough to provide coverage at a camera site sufficiently far from the IDF 104 to make sense from a design standpoint, but will also be short enough so as to follow generally accepted design rules for SCS. A practical range for the length of a horizontal run would be between 10 and 100 meters.

In the IDF 104 the other side of a horizontal run 214 terminates at a patch panel 216. A patch panel 216 will contain many RJ45 jacks for the termination of horizontal runs 214. Using patch cords 212, equipment located in IDF 104 can be cross connected through the patch panel 216 to the horizontal runs 214. One can understand how a telephone, computer or camera any where in the IDF 104 service area could be easily moved and reconnected using just patch cords 212.

Referring further to FIG. 2, there is a 24VAC power supply in the "IDF—Telcom Closet". This is a central power supply 218 used to power all of the cameras equipment connected to this IDF 104. The power supply 218 is connected to combiner unit 220. The combiner unit 220 brings together video, power and control signals and puts them together for connection to the horizontal. It provides fusing for each camera, reproduces the control signal and distributes it, and can, in some models, decode the video back into a BNC compatible signal. In the diagram a single combiner unit 220 powers both 12VDC and 24VAC cameras. A finer point of the combiner is the ability the select a specific output DV voltage. This application primarily refers to 12VDC because it is the most common. However, there are also cameras that use 5.5 VDC to 18 VDC. The DC voltage could be any of these values. Additionally, the output voltage of the combiner could be raised to help compensate for the voltage drop of a horizontal run. This unique ability to mix cameras of different power requirements in a single IDF 104, with a minimum of equipment provides an installer with a large degree of flexibility.

The combiner unit 220 also sorts video and control signals. The video and control signals are connected onto the "backbone" of the SCS. The "backbone" is a term that refers to the SCS wiring between IDF closets 104 and the MDF 102. This backbone wiring is terminated in the IDF 104 and MDF 102 using 110 punch-down blocks 222. 110 blocks allow wiring to be cross connected much like the use of RJ45 jacks, patch panels 216 and patch cords 212 work but the 110 block are a bit more permanent in nature. The IDF 104 wires from the camera location are cross connected with the IDF wiring of the security room 226 in the MDF 102.

The security room 226 houses standard video equipment used for the viewing and recording of the video cameras. The video and control signals are routed to and from the security room 226 over the backbone wiring of the SCS. In the security room 226 the video and control signals are routed through a patch panel 216 to the video equipment. The video signals are fed to special video receivers which decode the video and produce a standard BNC video output for connection to monitors and recorders, for example a DVR could be used as the recording device.

For smaller installations the SCS may consist of a single IDF 104 location which is the security room. Typically, if there is only one termination location for the horizontal runs 214 that location is called an MDF 102. For such smaller installations, the horizontal runs 214 from the cameras 206 would terminate in a patch panel 216 in the security room 226 and patch cords 212 would connect the horizontal runs 214 to a combiner unit 220. In this case, the combiner unit 220 would not connect the video and control signals to the backbone. Instead the combiner unit 220 would have a video Balun built-in to it. The video signals from the cameras would be decoded and provided on BNC connectors for connection into the standard monitors and recorders. Most applications are a combination of systems, where some video is sent over the backbone and some is direct to a security room 226.

The invention at hand provides a method to provide a 12 VDC rectifier and regulator at the IDF closet. By supplying 12 VDC from the IDF closet and not rectifying it at the camera end the noise in the video is eliminated. Even though there is a common ground in the new method the noise is eliminated because the current flowing in the horizontal run is DC and it is not changing. Also, the diode switching noise is in the IDF closet and therefore is prevented from coupling into the video wire pair. A unique feature of this invention is the "dual voltage" nature of the SCS solution. It is the first system to allow both 12 VDC and 24 VACCCTV cameras to operate simultaneously in a single structure cable equipment solution. This is a preferred solution for several reasons. First, there are no other connections outside of the standard SCS connections. Second, all electronics are now location in the IDF a system is easier to service. Third, it allows the installer to choose from either 12 VDC or 24 VACcameras giving a wider selection of cameras to choose from.

Figure 3:
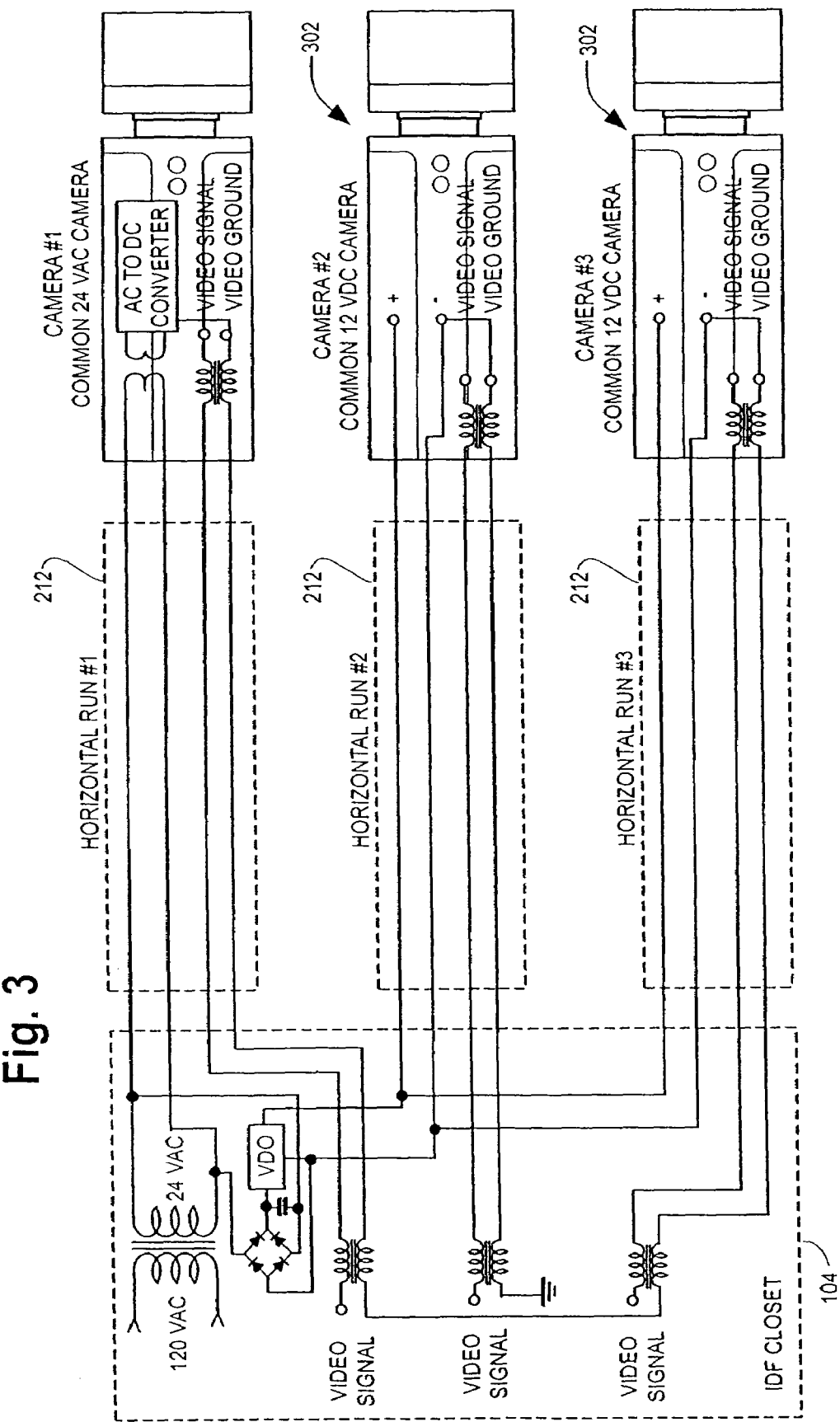
FIG. 3 is a wiring diagram depicting a structured cabling system incorporating 24 VAC cameras and 12 VDC cameras with voltage regulation and rectification circuitry located spaced apart from the camera site.

FIG. 3 shows how such a system is configured. The 12 VDC cameras 302 still have a common ground for both the power and the video. There is no longer a problem with noise in the video because as was explained above, the power flowing to the cameras over the horizontal is DC. This DC voltage maintains a constant current draw. This simple concept works well and allows a dual voltage system.

FIG. 2 also shows an embodiment of such a system. A power supply contains transformers. The power supply is coupled to the combiner unit using a jumper cord. There is one jumper cord for each of the cards within the combiner unit. A single combiner unit can hold up to 5 cards. The cards can be any mix of the available models. An installer will plug in one card for coupling the 24 VACto the horizontal and a different card for the 12 VDC.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A video system for interfacing with a structured cabling system of a building and for providing power to a plurality of cameras, each of which cameras has a video output for providing a video signal to multi-pair cable, comprising:
   a power supply for coupling to a plurality of cameras used with the structured cabling system, the power supply operable to provide a first voltage to power a first camera;
   a converter coupled to the power supply and operable to convert the first voltage to a second voltage and to provide the second voltage to power a second camera;
   the converter being spaced via multi-pair cable of the structured cabling system from said second camera by a distance of at least 5 meters.

2. A video system as defined by claim 1, in which the first voltage is an AC voltage.

3. A video system as defined by claim 2, in which said first voltage is 24 VAC.

4. A video system as defined by claim 1, in which said second voltage is a DC voltage.

5. A video system as defined by claim 4, in which said second voltage is 12 VDC.

6. A video system as defined by claim 2, in which said second voltage is 12 VDC.

7. A video system as defined by claim 1, in which the converter is spaced via multi-pair cable from said first camera by a distance of at least 5 meters.

8. A video system as defined by claim 7, in which the converter is spaced from said first camera and from said second camera by a distance that is greater than 10 meters.

9. A video system for interfacing with a structured cabling system of a building and for providing power to a plurality of cameras, each of which cameras has a video output for providing a video signal to multi-pair cable, comprising:
   a power supply for coupling to the plurality of cameras used with the structured cabling system, the power supply operable to provide an AC voltage to power a first camera;

a converter coupled to the power supply and operable to convert the AC voltage to a DC voltage and to provide the DC voltage to power a second camera;

the converter being spaced via multi-pair cable of the structured cabling system from said first camera and from said second camera by a distance that is greater than 10 meters.

10. A method of configuring a video system for interfacing with a structured cabling system of a building and for providing power to a plurality of cameras, each of which cameras has a video output for providing a video signal to multi-pair cable, comprising:

providing a power supply for coupling to the plurality of cameras used with the structured cabling system, the power supply being operable to provide a first voltage to power a first camera;

providing a converter for coupling to the power supply and operable to convert the first voltage to a second voltage and to provide the second voltage to power a second camera;

spacing the converter via multi-pair cable of the structured cabling system from said second camera by a distance of at least 5 meters.

11. A method as defined by claim 10, including spacing the converter via multi-pair cable from the first camera by a distance of at least 5 meters.

12. A method as defined by claim 10, in which said first voltage is an AC voltage and said second voltage is a DC voltage.

* * * * *